United States Patent
Izdepski et al.

(10) Patent No.: US 8,117,550 B1
(45) Date of Patent: Feb. 14, 2012

(54) REAL TO VIRTUAL TELECOMMUNICATIONS

(75) Inventors: Erich Izdepski, Falls Church, VA (US);
So Yun Maryn, Leesburg, VA (US);
Marc R. Plante, Vienna, VA (US); Min S. Yu, South Riding, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1021 days.

(21) Appl. No.: 12/037,627

(22) Filed: Feb. 26, 2008

(51) Int. Cl.
*G06F 3/00* (2006.01)

(52) U.S. Cl. ........ 715/753; 715/706; 715/757; 715/758; 709/204; 379/202.01; 379/204.01; 379/201.11; 455/414.1; 455/416

(58) Field of Classification Search ........... 715/706, 715/753, 757, 758; 709/204; 345/473; 455/412.1, 455/412.2, 414.1, 414.2, 414.3, 414.4, 418–420, 455/456.1, 456.3, 456.6, 457, 466, 502, 518, 455/519, 550.1, 552.1, 556.2, 566, 416; 379/93.21, 379/201.11, 202.01, 204.01
See application file for complete search history.

(56) References Cited

U.S. PATENT DOCUMENTS

| | | | |
|---|---|---|---|
| 7,086,005 B1* | 8/2006 | Matsuda | 715/706 |
| 2008/0144794 A1* | 6/2008 | Gardner | 379/202.01 |
| 2008/0263459 A1* | 10/2008 | Altberg et al. | 715/757 |
| 2009/0070688 A1* | 3/2009 | Gyorfi et al. | 715/758 |
| 2009/0089685 A1* | 4/2009 | Mordecai et al. | 715/757 |
| 2009/0138355 A1* | 5/2009 | Jung et al. | 705/14 |
| 2009/0209236 A1* | 8/2009 | Bloebaum et al. | 455/414.1 |

* cited by examiner

*Primary Examiner* — Anthony Addy

(57) ABSTRACT

Computer implemented methods and systems are provided for real to virtual communications. A request from a mobile device associated with a first participant of a virtual environment is received to communicate with an avatar associated with the virtual environment. A data store is referenced to identify a second participant of the virtual environment that is associated with the avatar. Whether the second participant is participating in the virtual environment is determined. A computer is communicated with in response to determining that the second participant is participating in the virtual environment, wherein the computer is associated with the second participant at least for participating in the virtual environment.

15 Claims, 5 Drawing Sheets

REAL TO VIRTUAL TELECOMMUNICATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Devices include applications such as media players that can enable device users to participate in virtual environments. In some virtual environments, participants are referred to as "residents" who interact with each other through moveable avatars, providing an advanced level of a social network service combined with general aspects of a virtual reality. An avatar in a virtual environment is a participants' representation of himself or herself in the form of a three-dimensional model. Residents can explore, meet other residents, socialize, participate in individual and group activities, create and trade items, such as virtual property, and services from one another. While such an environment is sometimes referred to as a game, this description does not fit the standard definition because some environments do not have points, scores, winners or losers, levels, an end-strategy, or most of the other characteristics of games, although these environments can be thought of as games on a more basic level because residents participate in the environments "for fun".

Other virtual environments include multiplayer online role-playing games, a genre of online computer role-playing games in which a large number of players interact with one another in a virtual world. As in most computer role-playing games, players assume the role of a fictional character, often in a fantasy world, and take control over many of that character's actions. Multiplayer online role-playing games may be distinguished from single-player or small multi-player computer role-playing games by the number of players, and by the game's persistent world, usually hosted by the game's publisher, which continues to exist and evolve while the player is away from the game.

Virtual environments allow participants to communicate with one another. Depending on the other interactions allowed by the virtual environment, other social expectations will be present. Many virtual environments exploit their participants' social skills and offer support for in-environment guilds or clans, though these will usually form whether the environment supports them or not. As a result, many participants will find themselves as either a member or a leader of such a group after participating in a virtual environment for some time. These organizations likely will have further expectations for their members, such as intra-guild assistance. Even if participants never join a formal group, they are still usually expected to be a part of a small team during environment participation, and probably will be expected to carry out a specialized role.

SUMMARY

The present disclosure provides computer implemented methods and systems for real to virtual communications. A request from a mobile device associated with a first participant in a virtual environment is received to communicate with an avatar associated with the virtual environment. A data store is referenced to identify a second participant in the virtual environment who is associated with the avatar. Whether the second participant is participating in the virtual environment is determined. A computer is communicated with in response to determining that the second participant is participating in the virtual environment, wherein the computer is associated with the second participant at least for participating in the virtual environment.

In some system embodiments, a server receives a request from a first mobile device associated with a first participant in a virtual environment to communicate with an avatar associated with the virtual environment. The server references a data store to identify a second participant in the virtual environment who is associated with the avatar. The server also determines whether a second mobile device associated with the second participant is available for communication. Additionally, the server communicates with the second mobile device in response to determining that the second mobile device associated with the second participant is available for communication.

In some other method embodiments, a request from a computer associated with a first participant in the virtual environment is received to communicate with an avatar associated with the virtual environment. A data store is referenced to identify a second participant in the virtual environment that is associated with the avatar. Whether a mobile device associated with the second participant is available for communication is determined. The mobile device is communicated with in response to determining that the mobile device associated with the second participant is available for communication.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Participants in a virtual environment may want to communicate with one another frequently, particularly with the other participants who are members of the same guild, clan, group, or team. However, because participants may know only the names of the avatars participating in the virtual environment, and not the other participant's actual names or telephone numbers, communications may be limited to virtual environment communications and communications in a computer chat room initiated for communication outside the virtual environment. If a participant is not using a computer to participate in the virtual environment or in the virtual environment's chat room, other participants may not be able to communicate with this participant to plan activities for their guild, clan, group, or team.

The present disclosure provides computer implemented methods and systems for real to virtual communications. In response to a participant using a mobile phone to call an avatar, a communication server references a data store to identify the participant associated with the avatar, who may be referred to as the avatar's participant. The communication server also contacts a component on the computer associated with the avatar's participant to determine whether the avatar's participant is currently using their computer to participate in the virtual environment. If the avatar's participant is using their computer to participate in the virtual environment, the communication server enables communication between the calling mobile phone and the avatar's computer. If the avatar's participant is not using their computer to participate in the virtual environment, the communication server enables communication between the calling mobile phone and the mobile phone used by the avatar's participant. The communication server may convert audio communication to text communication or text communication to audio communication to enable communication between participants. The communication server may enable simultaneous communications between any number of participants. The calling mobile phone may include a contact list of avatars that assists the caller in communicating with other participants. The mobile phones used for communication may display avatars' names instead of the names or telephone numbers of the other participants, thereby protecting the identities and the privacy of virtual environment participants. The participants may register availability schedules for receiving calls on their mobile phones. When the caller is not participating in the virtual environment, the caller may still communicate with other participants, even when the other participants are not participating in the virtual environment.

In response to a participant using their computer to call an avatar that is not participating in the virtual environment, the communication server references a data store to identify the avatar's participant. The communication server also contacts a component of the mobile phone associated with the avatar's participant to determine whether the avatar's participant is available for mobile phone communication. If the avatar's participant is available for mobile phone communication, the communication server enables communication between the computer and the mobile phone used by the avatar's participant. When a participant requests communication with other participants who are not participating in the virtual environment, the requesting participant may still communicate through the mobile phones of the other participants who are not participating in the virtual environment.

Figure 1:
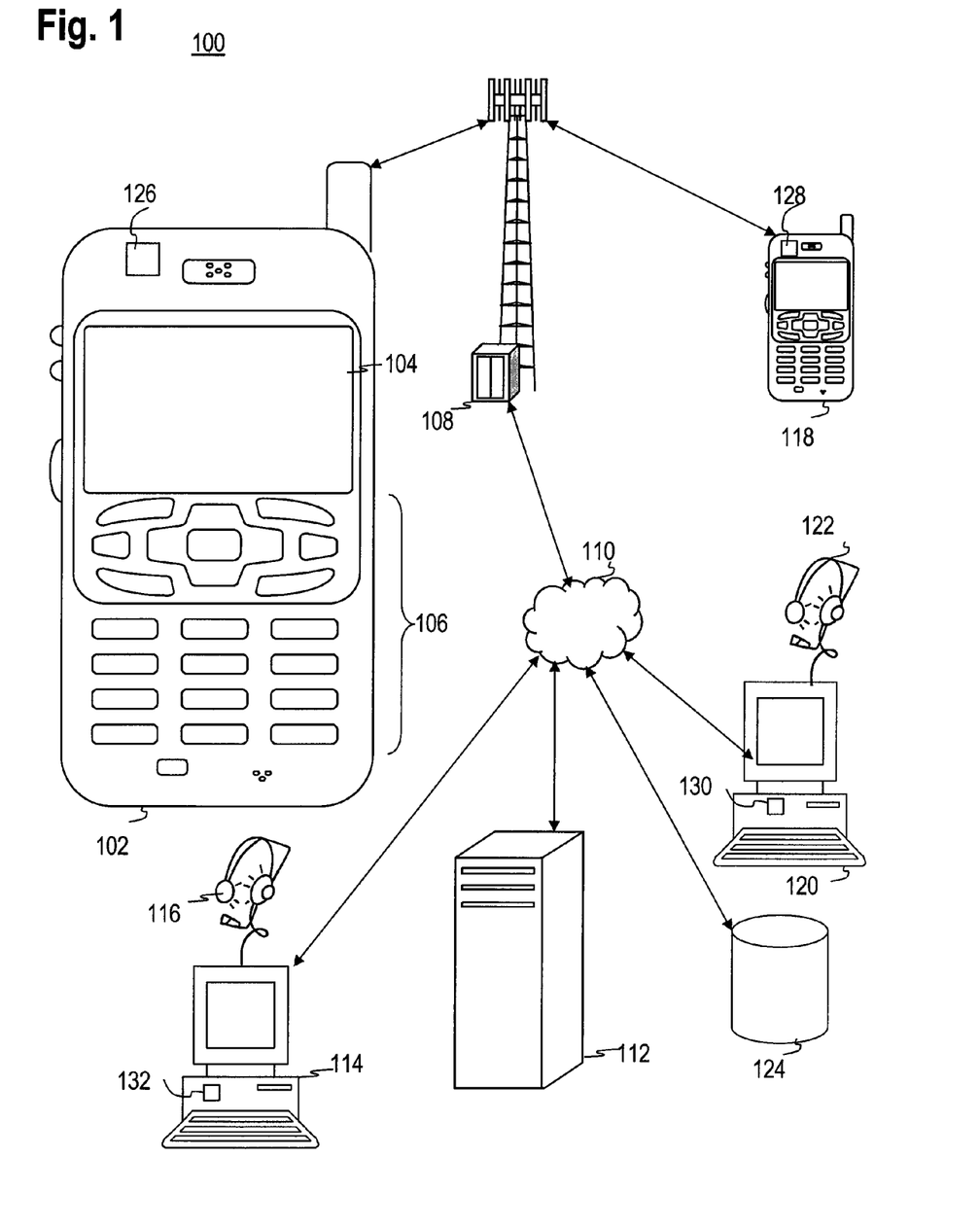
FIG. 1 shows a wireless communications system for real to virtual communication according to some embodiments of the present disclosure.

FIG. 1 shows a communications system 100 that is suitable for implementing several embodiments of the disclosure. The communication system 100 includes an illustrative mobile device 102. Though illustrated as a mobile phone, the mobile device 102 may take various forms including a personal digital assistant (PDA), a digital camera, a mobile phone or mobile telecommunication device, a digital music player, a mobile handset, a handheld gaming device, a wireless mobile device, a pager, and a digital calculator. Suitable devices may combine some or all of these functions. In some embodiments, the mobile device 102 may be a mobile phone with a media player that can play audio and video.

The mobile device 102 includes a display 104 and a touch-sensitive surface or keys 106 with which the user can also interact. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. Among the various applications executable by the mobile device 102 are a media player which may enable the mobile device 102 to participate in a virtual environment. These applications may configure the mobile device 102 to perform various customized functions in response to user interaction.

The mobile device 102 may communicate via wireless communications with a base transceiver station (BTS) 108, a wireless network access node, or another wireless communications network or system. The base transceiver station 108 (or wireless network access node) is coupled to a telecommunication network 110, such as the Internet. While one base transceiver station 108 is shown in FIG. 1, other base transceiver stations 108 could be present. Via the wireless link and the network 110, the mobile device 102 may have access to a virtual environment via various servers, such as a communication server 112.

The mobile device 102 may communicate with the base transceiver station 108 by a standard wireless telephony protocol (such as code division multiple access (CDMA), global system for mobile communication (GSM), universal mobile telecommunications system (UMTS), and worldwide interoperability for microwave access (WiMAX)), a wireless internet connection, or some other means of wireless communication.

A computer 114 may also communicate through the network 110 to participate in the virtual environment. The computer 114 may be associated with an audio device 116 that both enhances the ability to participate in the virtual environment and enables other forms of communication via the network 110, including communication via the communication server 112. The mobile device 102 may be associated with the computer 114 and the audio device 116 through the common use by a participant in the virtual environment.

The system 100 also includes a second mobile device 118, a second computer 120, and a second audio device 122. The second mobile device 118 may be associated with the second computer 120 and the second audio device 122 through the common use by a second participant of the virtual environment. The computer 114 and/or the second computer 120 may be a set top box, a game platform, or a mobile device, such as the mobile device 102 or the second mobile device 118. The communication server 112 may access a data store 124 to reference identifiers for participants in the virtual environment for the purpose of enabling real to virtual communication. Although depicted as separate from the communication server 112, the functions and capabilities of the data store 124 may be incorporated in the communication server 112.

The system 100 also includes a first component 126, a second component 128, a third component 130, and a fourth component 132, wherein the components 126—132 may be implemented by software, hardware, and/or a combination of software and hardware. In some embodiments, the components 126—132 may assist the communication server 112 with communications. For example, the first component 126 may receive a request from the mobile device 102 associated with a first participant of a virtual environment to communicate with an avatar associated with the virtual environment, and may convey the request to the communication server 112. The second component 128 may determine whether the second mobile device 118 associated with the second participant is available for communication, and convey the determination to the communication server 112. The third component 130 may determine whether the second participant is participating in the virtual environment on the second computer 120, and convey the determination to the communication server 112. The fourth component 132 may receive a request from the first computer 114 associated with the first participant of the virtual environment to communicate with an avatar associated with the virtual environment, and may convey the request to the communication server 112. For illustrative purposes, the disclosure may refer to the second mobile device 118 as Bill's mobile device 118.

Figure 2:
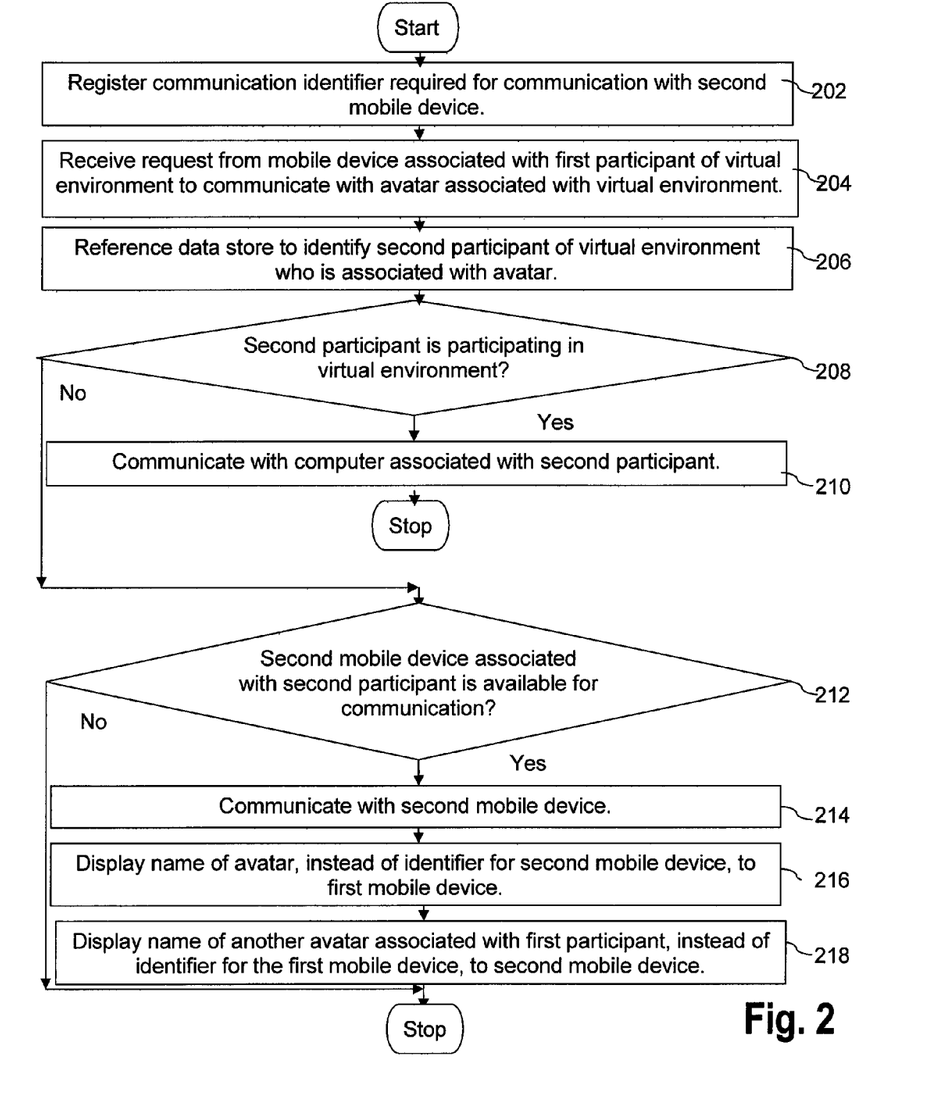
FIG. 2 shows a flowchart of a method for real to virtual communication according to some embodiments of the present disclosure.

FIG. 2 is a flowchart illustrating a method for real to virtual communication according to some embodiments of the present disclosure. The system 100 may execute the method to enable a participant in the virtual environment to use a mobile device to communicate with an avatar's participant, either through a computer used by the avatar's participant, or through a mobile device used by the avatar's participant.

In box 202, a communication identifier required for communication with the second mobile device 118 is registered. For example, Bill, who participates in a war game with an avatar of General Bernard Montgomery, registers his telephone number as the communication identifier required for real to virtual communication with Bill's mobile device 118. Bill may identify an availability schedule for Bill's mobile device 118, such as 6 p.m. to 10 p.m. on weekdays and 9 a.m. to 11 p.m. on weekends.

In box 204, a request from a mobile device associated with a first participant of the virtual environment is received to communicate with an avatar associated with the virtual environment. For example, Andy, who participates in the war game as the avatar General George Patton, requests via Andy's mobile device 102 to communicate with General Bernard Montgomery, and the first component 126 both receives the request and conveys the request to the communication server 112. While Andy's mobile device 102 may be configured to participate in the war game, Andy normally may participate in the war game via Andy's computer 114. Andy's mobile device 102 may have a contact list of war game avatars that help Andy to request communication with the war game avatars. In another example, Andy requests via Andy's mobile device 102 to communicate with a landowner avatar that is resident in the same virtual town where Andy's avatar is resident, and the first component 126 both receives the request and conveys the request to the communication server 112.

In box 206, a data store is referenced to identify the second participant of the virtual environment who is associated with the avatar. For example, the communication server 112 references the data store 124 to identify information associated with the participant who participates in the war game as General Bernard Montgomery. In another example, the communication server 112 references the data store 124 to identify information associated with the participant who participates in the war game as the requested landowner avatar.

In box 208, whether the second participant is participating in the virtual environment is determined. For example, the communication server 112 requests a determination of whether the second participant is available for communication, and the third component 130 determines whether Bill is currently participating in the war game by determining whether Bill is logged in to Bill's computer 120 to participate in the war game. The third component 130 conveys the determination to the communication server 112. If the third component 130 determines that the second participant is participating in the virtual environment, the method continues to box 210. If the third component 130 determines that the second participant is not participating in the virtual environment, the method proceeds to box 212. In another example, the communication server 112 requests a determination of whether the participant associated with the landowner avatar is participating in the virtual world.

In box 210, the computer associated with the second participant is communicated with. For example, the communication server 112 enables Andy's mobile device 102 to communicate with the computer 120, which Bill is currently using to participate in the war game. In another example, the communication server 112 enables Andy's mobile device 102 to communicate with the landowner avatar's computer to negotiate a trade of a car owned by Andy's avatar for a parcel of land owned by the landowner avatar. The communication server 112 may reference the data store 124 to identify a communication identifier, such as Bill's internet protocol address, required for communication with Bill's computer 120. The communication server 112 may also convey voice communication between Andy's mobile device 102 and Bill's audio device 122. Additionally, the communication server 112 may convert Andy's voice and Bill's voice to enable Andy and Bill to remain anonymous and/or to enable Andy and Bill to sound more like their avatars. For example, if a young female participates in a game as an ogre, the communication server 112 converts her high voice to a deep voice that sounds more like an ogre's voice. Furthermore, the communication server 112 may convert audio communications from Andy's mobile device 102 to text for Bill's computer 120 and convert text from Bill's computer 120 to audio for Andy's mobile device 102. Moreover, the communication server 112 may convey text messages from Andy's mobile device 102 to Bill's computer 120 and convey text messages from Bill's computer 120 to Andy's mobile device 102. The communication server 112 may also convert a text message from Andy's mobile device 102 to audio for Bill's audio device 122 and convert audio communications from Bill's audio device 122 to text messages for Andy's mobile device 102. If each of Andy's mobile device 102 and Bill's computer 120 include both a media player and a camera, the communication between Andy's mobile device 102 and Bill's computer 120 may also include video conferencing. If Bill's computer 120 does not respond to the attempt by Andy's mobile device 102 to communicate, Andy's mobile device 102 may present Andy with an option to leave a message for Bill's computer 120, which Bill's computer 120 may later retrieve as a voice message, a text message, and/or a video message. When the communication between Andy's mobile device 102 and Bill's computer 120 is completed, the method terminates.

In box 212, whether the second mobile device associated with the second participant is available for communication is determined. For example, the communication server 112 requests the second component 128 to determine whether the Bill's mobile device 118 is available for communication. The communication server 112 may identify a communication identifier, such as Bill's telephone number, required for communication with Bill's mobile device 118. In addition to the second component 128 determining whether Bill's mobile device 118 is currently operating, the communication server 112 may also reference Bill's availability schedule to determine if Bill's mobile device 118 is available for communication. If the second component 128 and the communication server 112 determine that the second mobile device 118 associated with the second participant is available for communication, the method continues to box 214. If the second component 128 and the communication server 112 determine that the second mobile device 118 associated with the second participant is not available for communication, the method terminates.

In box 214, the second mobile device is communicated with. For example, the communication server 112 conveys audio communications between Andy's mobile device 102 and Bill's mobile device 118. If each of Andy's mobile device 102 and Bill's mobile device 118 include both a media player and a camera, the communication between Andy's mobile device 102 and Bill's mobile device 118 may also include video conferencing. If Bill's mobile device 118 does not respond to the attempt by Andy's mobile device 102 to communicate, Andy's mobile device 102 may present Andy with an option to leave a message for Bill's mobile device 118, which Bill's mobile device 118 may later retrieve as a voice message, a text message, and/or a video message.

In box 216, the name of the avatar, instead of the identifier for the second mobile device, is displayed to the first mobile device. For example, the first component 126 displays the name of the avatar, General Bernard Montgomery, instead of Bill's name or the telephone number for Bill's mobile device 118, to Andy's mobile device 102, thereby protecting Bill's identity and privacy.

In box 218, the name of another avatar associated with the first participant, instead of an identifier for the first mobile device, is displayed to the second mobile device 118. For example, the second component 128 displays the name of Andy's avatar, General George Patton, instead of Andy's name or the telephone number for Andy's mobile device 102, to Bill's mobile device 118, thereby protecting Andy's identity and privacy.

Figure 3:
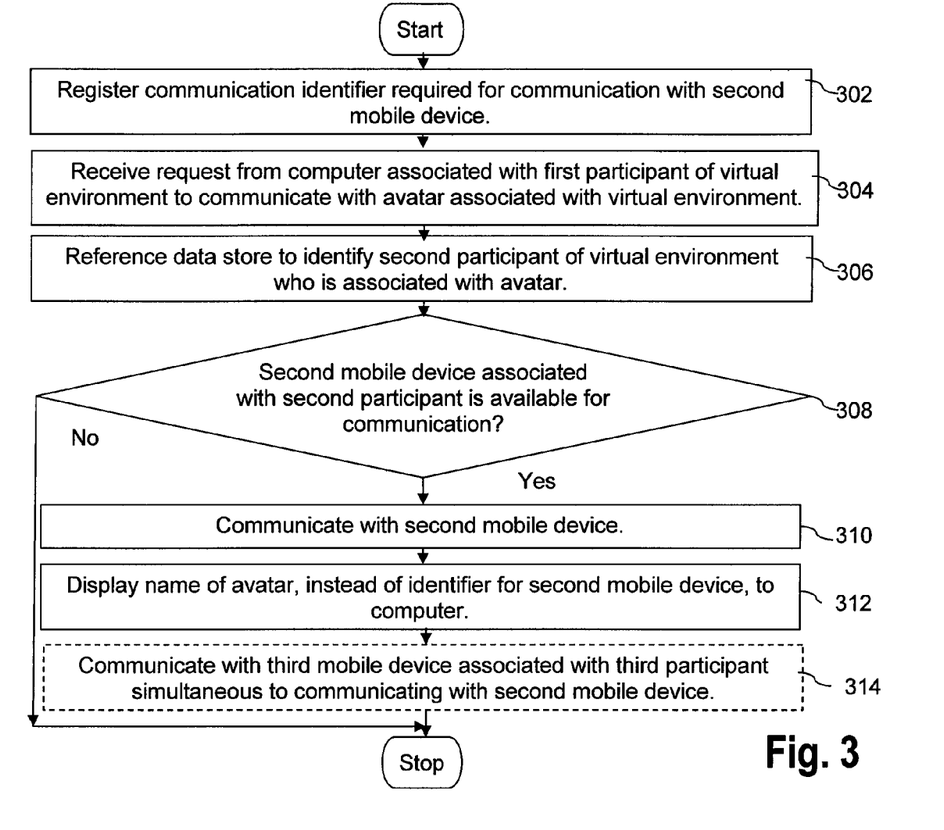
FIG. 3 shows a flowchart of another method for real to virtual communication according to some embodiments of the present disclosure.

FIG. 3 is a flowchart illustrating another method for real to virtual communication according to some embodiments of the present disclosure. The system 100 may execute the method to enable a participant who is participating in the virtual environment to use the participant's computer to call an avatar in the virtual environment through a mobile device used by the avatar's participant.

In box 302, a communication identifier required for communication with a mobile device is registered. For example, Bill, who participates in a war game with an avatar of General Bernard Montgomery, registers the telephone number required for real to virtual communication with Bill's mobile device 118.

In box 304, a request from a computer associated with the first participant of the virtual environment is received to communicate with an avatar associated with the virtual environment. For example, Andy, who participates in the war game with an avatar General George Patton, requests via Andy's computer 114 to communicate with General Bernard Montgomery. Andy may also request to communicate with General Charles De Gaulle. Andy may have attempted to communicate with General Bernard Montgomery and General Charles De Gaulle via the war game and realized that the participants whose avatars are General Bernard Montgomery and General Charles De Gaulle are not currently participating in the war game. The fourth component 132 receives the request and conveys the request to the communication server 112.

In box 306, a data store is referenced to identify the second participant of the virtual environment who is associated with the avatar. For example, the communication server 112 references the data store 124 to identify Bill as a participant who participates in the war game as General Bernard Montgomery. The communication server 112 may also reference the data store 124 to identify Chris as a participant who participates in the war game as General Charles De Gaulle.

In box 308, whether the second mobile device associated with the second participant is available for communication is determined. For example, the communication server 112 requests the second component 128 to determine whether Bill's mobile device 118 is available for communication. The communication server 112 may also request a fifth component, which is not depicted, to determine whether Chris' mobile device is available for communication. If the second component 128 determines that Bill's mobile device 118 is available for communication, the method continues to box 310. If the second component 128 determines that Bill's mobile device 118 is not available for communication, the method terminates.

In box 310, the second mobile device is communicated with. For example, the communication server 112 conveys communication between Andy's computer 114 and Bill's mobile device 118. If each of Andy's computer 114 and Bill's mobile device 118 include both a media player and a camera, the communication between Andy's computer 114 and Bill's mobile device 118 may also include video conferencing. If Bill's mobile device 118 does not respond to the attempt by Andy's computer 114 to communicate, Andy's computer 114 may present Andy with an option to leave a message for Bill's mobile device 118, which Bill's mobile device 118 may later retrieve as a voice message, a text message, and/or a video message In box 312, the name of the avatar, instead of the identifier for the second mobile device, is displayed to the computer. For example, the fourth component 132 displays the name of the avatar, General Bernard Montgomery, instead of Bill's name or the telephone number for Bill's mobile device 118, to Andy's computer 114.

In box 314, a third mobile device associated with a third participant is communicated with simultaneous to communicating with the second mobile device. The communication server 112 may also convey communication between Andy's computer 114, Bill's mobile device 118, and Chris' mobile device. The fourth component 132 and the second component 128 may also display the name of the avatar, General Charles De Gaulle, instead of Chris' name or the telephone number for Chris' mobile device, to Andy's computer 114 and to Bill's mobile device 118, respectively.

In some embodiments, one communication identifier required for communication is not associated with any single participant in the virtual environment, but with all participants in the virtual environment, such as in a push-to-talk or press-to-transmit (PTT) communications. For example, Andy's mobile device 102 requests to communicate with every avatar associated with the war game, and the communication server 112 references the data store 124 to identify each participant who is associated with any of the avatars.

Then the communication server 112 enables Andy's mobile device 102 to communicate with every computer participating in the war game and every participant's mobile device that is available for communication via PTT communications.

Figure 4:
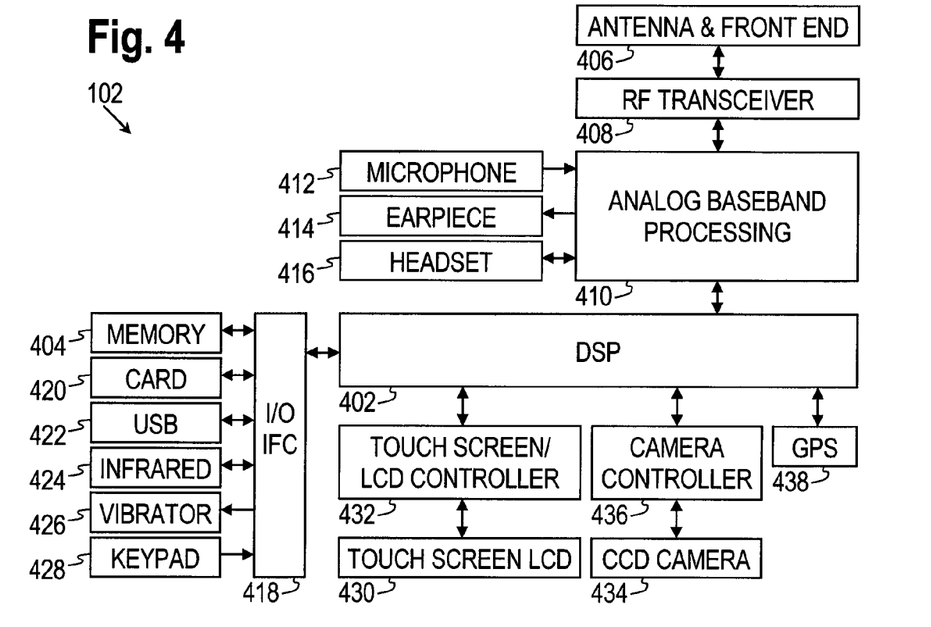
FIG. 4 shows a block diagram of an illustrative mobile device.

FIG. 4 shows a block diagram of the mobile device or handset 102. While a variety of known components of mobile devices 102 are depicted, in an embodiment a subset of the listed components and/or additional components not listed may be included in the mobile device 102. The mobile device 102 includes a digital signal processor (DSP) 402 and a memory 404. As shown, the mobile device 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the mobile device 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the mobile device 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the mobile device 102 to send and receive information from a cellular network or some other available wireless communications network or from a peer mobile device 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF transceiver 408, portions of the antenna and front end 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset port 416 and outputs to the earpiece speaker 414 and the headset port 416. To that end, the analog baseband processing unit 410 may have ports for connecting to the built-in microphone 412 and the earpiece speaker 414 that enable the mobile device 102 to be used as a cell phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast fourier transforming, and cyclic prefix appending, and for a receiver function the DSP 402 may perform cyclic prefix removal, fast fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB port 422 and the infrared port 424. The USB port 422 may enable the mobile device 102 to function as a peripheral device to exchange information with a personal computer or other computer system. The infrared port 424 and other optional ports such as a Bluetooth interface or an IEEE 802.11 compliant wireless interface may enable the mobile device 102 to communicate wirelessly with other nearby mobile devices and/or wireless base stations.

The input/output interface 418 may further connect the DSP 402 to the vibrator 426 that, when triggered, causes the mobile device 102 to vibrate. The vibrator 426 may serve as a mechanism for silently alerting the user to any of various events such as an incoming call, a new text message, and an appointment reminder.

The keypad 428 couples to the DSP 402 via the input/output interface 418 to provide one mechanism for the user to make selections, enter information, and otherwise provide input to the mobile device 102. Another input mechanism may be the touch screen LCD 430, which may also display text and/or graphics to the user. The touch screen LCD controller 432 couples the DSP 402 to the touch screen LCD 430.

The CCD camera 434 enables the mobile device 102 to take digital pictures. The DSP 402 communicates with the CCD camera 434 via the camera controller 436. The GPS sensor 438 is coupled to the DSP 402 to decode global positioning system signals, thereby enabling the mobile device 102 to determine its position. In another embodiment, a camera operating according to a technology other than Charge Coupled Device cameras may be employed. Various other peripherals may also be included to provide additional functions, e.g., radio and television reception.

Figure 5:
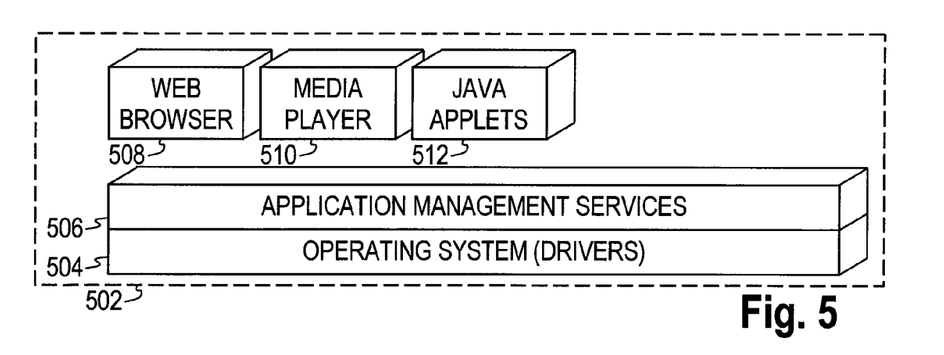
FIG. 5 shows a block diagram of an illustrative software configuration for a mobile device.

FIG. 5 illustrates a software environment 502 that may be implemented by the DSP 402. The DSP 402 executes operating system drivers 504 that provide a platform from which the rest of the software operates. The operating system drivers 504 provide drivers for the mobile device hardware with standardized interfaces that are accessible to application software. The operating system drivers 504 include application management services ("AMS") 506 that transfer control between applications running on the mobile device 102. Also shown in FIG. 5 are a web browser application 508, a media player application 510, and JAVA applets 512. The web browser application 508 configures the mobile device 102 to operate as a web browser, allowing a user to enter information into forms and select links to retrieve and view web pages. The media player application 510 configures the mobile device 102 to retrieve and play audio or audiovisual media. The JAVA applets 512 configure the mobile device 102 to provide games, utilities, and other functionality.

Figure 6:
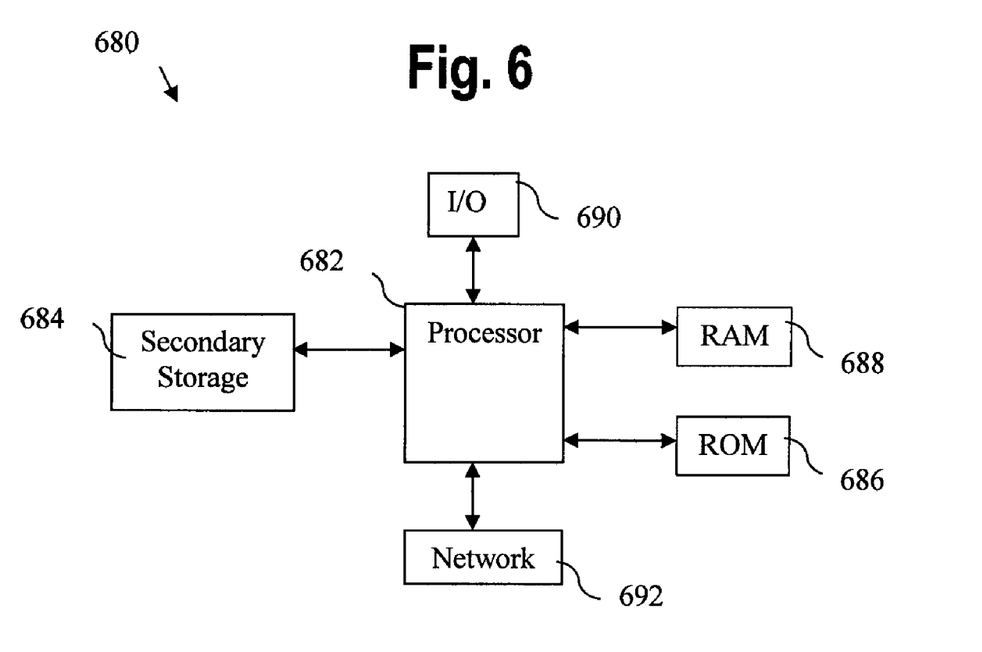
FIG. 6 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 6 illustrates a typical, general-purpose computer system suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if the RAM 688 is not large enough to hold all working data. Secondary storage 684 may be used to store programs which are loaded into the RAM 688 when such programs are selected for execution. The ROM 686 is used to store instructions and perhaps data which are read during program execution. The ROM 686 is a non-volatile memory device which typically has a small memory capacity relative to the larger memory capacity of secondary storage. The RAM 688 is used to store volatile data and perhaps to store instructions. Access to both the ROM 686 and the RAM 688 is typically faster than to the secondary storage 684.

The I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), worldwide interoperability for microwave access (WiMAX), and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using the processor 682, may be received from and outputted to the network, for example, in the form of a computer data signal embodied in a carrier wave.

Such information, which may include data or instructions to be executed using the processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered the secondary storage 684), the ROM 686, the RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for real to virtual communications, comprising:
   receiving a request from a first handheld device associated with a first participant of a virtual environment to initiate an anonymous avatar-based communication associated with the virtual environment, wherein the request is initiated by the first participant selecting an avatar from a contact list of avatars maintained on the first handheld device to enable interaction between the first participant and other participants of the virtual environment when the first participant is not logged into the virtual environment;
   referencing a data store to identify a second participant of the virtual environment that is associated with the avatar;
   determining whether the second participant is logged into the virtual environment;
   when the second participant is logged into the virtual environment, enabling the anonymous avatar-based communication between the first handheld device associated with the first participant and a computer at which the second participant has logged into the virtual environment;
   when the second participant is not logged into the virtual environment, determining whether the second participant has registered a second handheld device to receive the anonymous avatar-based communications;
   in response to determining that the second participant has registered the second handheld device, enabling the anonymous avatar-based communication between the first handheld device associated with the first participant and the second handheld device associated with the second participant;
   in response to determining that the second participant has registered the second handheld device with the virtual environment, determining whether the second handheld device associated with the second participant is available for communication;
   communicating with the second handheld device in response to determining that the second handheld device associated with the second participant is available for communication;
   identifying a third participant of the virtual environment that is associated with a second avatar; and
   communicating with a third mobile device associated with the third participant simultaneous to communicating with the second handheld device.

2. The computer implemented method of claim 1, wherein communicating with the computer at which the second participant has logged into the virtual environment comprises voice communication via an audio device associated with the computer, and wherein the voice communication converts a voice of the first participant and a voice of the second participant.

3. The computer implemented method of claim 1, wherein communicating with the computer at which the second participant has logged into the virtual environment comprises converting audio from the first handheld device to text for the computer and converting text from the computer to audio for the mobile first handheld device.

4. The computer implemented method of claim 1, wherein communicating with the computer at which the second participant has logged into the virtual environment comprises communicating text messages from the first handheld device and communicating text messages to the first handheld device.

5. The computer implemented method of claim 1, wherein communicating with the computer at which the second participant has logged into the virtual environment comprises converting text from the first handheld device to audio for an audio device associated with the computer and converting audio from the audio device associated with the computer to text for the first handheld device.

6. The computer implemented method of claim 1, wherein the first handheld device is configured to participate in the virtual environment.

7. The computer implemented method of claim 1, further comprising determining whether the second participant has registered an availability schedule for receiving calls on the second handheld device and, if so, enabling communications between the first handheld device and the second handheld device in accordance with the availability schedule.

8. A system for real to virtual communications, comprising:
   a first component configured to receive a request from a first handheld device associated with a first participant of a virtual environment to initiate an anonymous avatar-based communication associated with the virtual environment, and to convey the request, wherein the request is initiated via a user interface on the first handheld device that enables interaction between the first participant and other participants of the virtual environment while the first participant is not logged into the virtual environment;
   a server configured to receive the request, and to reference a data store to identify a second participant of the virtual environment that is associated with a first avatar and a third participant of the virtual environment that is associated with a second avatar, and to request a determination of whether the second participant is available for communication;
   a second component configured to determine whether a second handheld device associated with the second participant is available for communication, and to convey the determination to the server, wherein the server is further configured to convey communication between the first handheld device and the second handheld device in response to the second component determining that the second handheld device associated with the second participant is available for communication, and wherein the server is further configured to convey communication between the first handheld device and a third mobile device associated with the third participant simultaneous to conveying communication between the first handheld device and the second handheld device.

9. The system of claim 8, further comprising a third component configured to determine whether the second participant is logged into the virtual environment, and to convey the determination to the server, wherein the server is further configured to promote communication with a computer at which the second participant has logged into the virtual environment in response to the third component determining that the second participant is logged into the virtual environment.

10. The system of claim 8, wherein the first handheld device is one of a mobile telecommunication device, a mobile handset, a personal digital assistant, a handheld gaming device, a wireless mobile device, a pager, a portable computer, a tablet computer, a digital camera, a digital music player, and a digital calculator.

11. The system of claim 8, wherein the user interface comprises a contact list of avatars to promote the request from the first handheld device associated with the first participant of the virtual environment to communicate with the avatar associated with the second participant.

12. The system of claim 8, wherein the server is further configured to identify a communication identifier required for communication with the second handheld device.

13. The system of claim 12, wherein the communication identifier comprises at least one of a telephone number and an internet protocol address.

14. The system of claim 8, wherein the first component is further configured to display a name of the avatar, instead of an identifier for the second handheld device, to the first handheld device.

15. The system of claim 8, wherein the second component is further configured to display a name of another avatar associated with the first participant, instead of an identifier for the first handheld device, to the second handheld device.

* * * * *